United States Patent
Sathish et al.

(10) Patent No.: US 10,296,532 B2
(45) Date of Patent: May 21, 2019

(54) APPARATUS, METHOD AND COMPUTER PROGRAM PRODUCT FOR PROVIDING ACCESS TO A CONTENT

(71) Applicant: Nokia Technologies Oy, Espoo (FI)

(72) Inventors: Sailesh Sathish, Bangalore (IN); Igor Danilo Diego Curcio, Tampere (FI)

(73) Assignee: Nokia Technologies Oy, Espoo (FI)

(*) Notice: Subject to any disclaimer, the term of this patent is extended or adjusted under 35 U.S.C. 154(b) by 468 days.

(21) Appl. No.: 14/425,355

(22) PCT Filed: Sep. 18, 2012

(86) PCT No.: PCT/FI2012/050900
§ 371 (c)(1),
(2) Date: Mar. 3, 2015

(87) PCT Pub. No.: WO2014/044898
PCT Pub. Date: Mar. 27, 2014

(65) Prior Publication Data
US 2015/0227513 A1   Aug. 13, 2015

(51) Int. Cl.
*G06F 16/438* (2019.01)
*G06F 16/951* (2019.01)
*H04N 21/858* (2011.01)
*H04N 7/15* (2006.01)
*H04N 21/234* (2011.01)
*H04N 21/2743* (2011.01)
*H04N 21/845* (2011.01)
(Continued)

(52) U.S. Cl.
CPC .......... *G06F 16/438* (2019.01); *G06F 16/951* (2019.01); *G06F 17/3005* (2013.01); *G06F 17/30864* (2013.01); *G11B 27/031* (2013.01); *H04L 65/60* (2013.01); *H04N 7/15* (2013.01); *H04N 21/23418* (2013.01); *H04N 21/2743* (2013.01); *H04N 21/8456* (2013.01); *H04N 21/858* (2013.01)

(58) Field of Classification Search
CPC .......... G06F 17/3005; G06F 17/30864; G11B 27/031; H04L 65/60; H04N 7/15
USPC ....................................................... 707/769
See application file for complete search history.

(56) References Cited

U.S. PATENT DOCUMENTS 7,627,648 B1* 12/2009 Mehta ............... G06F 17/30905
709/217
2008/0263010 A1* 10/2008 Roychoudhuri .. G06F 17/30056
(Continued)

OTHER PUBLICATIONS

International Search Report and Written Opinion received for corresponding Patent Cooperation Treaty Application No. PCT/FI2012/050900, dated Sep. 18, 2012, 14 pages.

*Primary Examiner* — Syed H Hasan
*Assistant Examiner* — Nicholas E Allen
(74) *Attorney, Agent, or Firm* — Ditthavong & Steiner, P.C.

(57) ABSTRACT

There is provided methods, apparatuses and computer program products for obtaining access to contents. In a method a content for at least one segment of a media presentation is defined. A meta information element for the media presentation is provided. Further, meta data relating to the content of the at least one segment is included to the meta information element. The meta data comprises information on how to access the content of the segment. A reference to the meta data of the content is included in the segment.

20 Claims, 7 Drawing Sheets

(51) Int. Cl.
  *G11B 27/031*   (2006.01)
  *G06F 17/30*    (2006.01)
  *H04L 29/06*    (2006.01)

(56)              References Cited

U.S. PATENT DOCUMENTS

| | | | | |
|---|---|---|---|---|
| 2008/0290987 A1* | 11/2008 | Li | ................... | G06Q 30/02 |
| | | | | 340/5.1 |
| 2009/0276805 A1 | 11/2009 | Andrews et al. | | |
| 2010/0088159 A1* | 4/2010 | Henshaw | ............... | G06Q 10/02 |
| | | | | 715/716 |
| 2010/0146145 A1* | 6/2010 | Tippin | ............. | H04N 21/23424 |
| | | | | 709/236 |
| 2011/0018998 A1* | 1/2011 | Guzik | ................... | H04N 21/21 |
| | | | | 348/143 |
| 2011/0099195 A1* | 4/2011 | Patwardhan | ........ | G06F 17/3084 |
| | | | | 707/769 |
| 2011/0161409 A1* | 6/2011 | Nair | ......................... | G06F 8/38 |
| | | | | 709/203 |
| 2011/0212717 A1* | 9/2011 | Rhoads | ............. | G06F 17/30241 |
| | | | | 455/420 |
| 2011/0263946 A1* | 10/2011 | el Kaliouby | ......... | A61B 5/1128 |
| | | | | 600/300 |
| 2012/0062732 A1* | 3/2012 | Marman | ................... | H04N 7/18 |
| | | | | 348/142 |
| 2012/0110455 A1* | 5/2012 | Sharma | ................ | G06Q 10/101 |
| | | | | 715/719 |
| 2012/0206566 A1* | 8/2012 | Fedoseyeva | ..... | G06Q 10/06398 |
| | | | | 348/38 |
| 2012/0209841 A1 | 8/2012 | Saretto et al. | | |
| 2012/0226899 A1 | 9/2012 | Sathish | | |
| 2012/0246267 A1* | 9/2012 | Mallet | ................... | G06Q 50/01 |
| | | | | 709/217 |
| 2012/0278831 A1* | 11/2012 | van Coppenolle | .......................... | |
| | | | | H04L 65/4084 |
| | | | | 725/25 |
| 2012/0308209 A1* | 12/2012 | Zaletel | ................ | G11B 27/034 |
| | | | | 386/278 |
| 2013/0031208 A1* | 1/2013 | Linton | ................... | H04L 67/125 |
| | | | | 709/217 |

* cited by examiner

APPARATUS, METHOD AND COMPUTER PROGRAM PRODUCT FOR PROVIDING ACCESS TO A CONTENT

RELATED APPLICATION

This application was originally filed as Patent Cooperation Treaty Application NO. PCT/FI2012/050900 filed Sep. 18, 2012.

TECHNICAL FIELD

The present invention relates to a method at an apparatus for providing a way to embed access to dynamic services within a media file. The invention further relates to an apparatus and a computer program product for providing a way to embed access to dynamic services within a media file.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Cameras are often used to capture images and/or video in many events and locations users visit. There may also be some other users nearby capturing images and/or video in the same event but from a different view point. The images and videos can be uploaded to a server in a network, such as the internet, to be available for downloading by other users. When one plays back the video s/he might also want to see images and/or videos captured by others during the event, or s/he might want to obtain other information relating to the event and/or person(s) visible in the video(s). Users may wish, for example, to seek alternative view points, alternate tracks, alternate edits and alternate media even during playback or rendering of media. It may, however, be a cumbersome task to find those images, videos and/or other information from the network.

SUMMARY

This invention is related to providing a way to embed access to dynamic services within a media file in which information relating to the dynamic services are embedded.

Some embodiments relate to seeking multiview, multimodal and/or multicontent types in a dynamic manner during a session within a media renderer or a browser. This may be performed by utilizing additional information stored or otherwise attached with the media. Some embodiments provide a framework that provides logical embed within media files allowing seeking several additional features or content back from a server or another device during playback time. This may allow the user to dynamically interact with the content while playing media providing a richer experience while being able to leverage the full bandwidth of available media and media types related to the content being played.

In some embodiments the logical extension embedded allows even players embedded within web content to leverage hypertext mark-up language version 5 (HTML5) and beyond with browser capabilities in seeking content.

Some embodiments provide means to keep media size relatively small when transmitting to a device over wireless network although there would be some multicontent available for the media. Some embodiments also provide multicontent that are media (e.g. video) segment specific enabling richer media. Access to the multi-content may also be dynamic as sought by the user. In some embodiments multiple access types are supported with access types dependent on multicontent-type. Many devices, browsers and rendering engines can be arranged to support some embodiments. Practical implementations may be made to be compatible with some existing standard or standards or they may use some proprietary methods.

In this context the term multicontent means additional content that users can perceive about a particular segment of media (e.g. a video). The additional content can either be statically provided through embedding within the media and displayed by the renderer suitably or can be dynamic where it can be sought from external sources from within a segment as and when needed. Each content type may have a different source and a different model of accessing those. The access models and the semantic blocks for accessing the additional content may vary in different embodiments.

According to a first aspect of the invention, there is provided a method comprising:
   defining a content for at least one segment of a media presentation;
   providing a meta information element for the media presentation;
   including meta data relating to the content of the at least one segment to the meta information element, the meta data comprising information on how to access the content of the segment; and
   including a reference to the meta data of the content in the segment.

According to a second aspect of the invention, there is provided an apparatus comprising at least one processor and at least one memory including computer program code, the at least one memory and the computer program code configured to, with the at least one processor, cause the apparatus to perform at least the following:
   define a content for at least one segment of a media presentation;
   provide a meta information element for the media presentation;
   include meta data relating to the content of the at least one segment to the meta information element, the meta data comprising information on how to access the content of the segment; and
   include a reference to the meta data of the content in the segment.

According to a third aspect of the invention, there is provided a computer program product including one or more sequences of one or more instructions which, when executed by one or more processors, cause an apparatus to perform at least the following:
   define a content for at least one segment of a media presentation;
   provide a meta information element for the media presentation;
   include meta data relating to the content of the at least one segment to the meta information element, the meta data comprising information on how to access the content of the segment; and
   include a reference to the meta data of the content in the segment.

According to a fourth aspect of the invention, there is provided an apparatus comprising:
- means for defining a content for at least one segment of a media presentation;
- means for providing a meta information element for the media presentation;
- means for including meta data relating to the content of the at least one segment to the meta information element, the meta data comprising information on how to access the content of the segment; and
- means for including a reference to the meta data of the content in the segment.

According to a fifth aspect of the invention, there is provided a method at an apparatus, comprising:
- obtaining a media presentation comprising at least one segment;
- obtaining a meta information element attached with the media presentation, the meta information element comprising information on how to access content of the at least one segment; and
- examining a reference included in the meta information element to a meta data provided for the at least one segment, the meta data comprising information on how to access the content of the segment.

According to a sixth aspect of the invention, there is provided an apparatus comprising at least one processor and at least one memory including computer program code, the at least one memory and the computer program code configured to, with the at least one processor, cause the apparatus to perform at least the following:
- obtain a media presentation comprising at least one segment;
- obtain a meta information element attached with the media presentation, the meta information element comprising information on how to access content of the at least one segment;
- examine a reference included in the meta information element to a meta data provided for the at least one segment, the meta data comprising information on how to access the content of the segment.

According to a seventh aspect of the invention, there is provided a computer program product including one or more sequences of one or more instructions which, when executed by one or more processors, cause an apparatus to perform at least the following:
- obtain a media presentation comprising at least one segment;
- obtain a meta information element attached with the media presentation, the meta information element comprising information on how to access content of the at least one segment;
- examine a reference included in the meta information element to a meta data provided for the at least one segment, the meta data comprising information on how to access the content of the segment.

According to an eighth aspect of the invention, there is provided an apparatus comprising:
- means for obtaining a media presentation comprising at least one segment;
- means for obtaining a meta information element attached with the media presentation, the meta information element comprising information on how to access content of the at least one segment;
- means for examining a reference included in the meta information element to a meta data provided for the at least one segment, the meta data comprising information on how to access the content of the segment.

DESCRIPTION OF THE DRAWINGS

In the following, various embodiments of the invention will be described in more detail with reference to the appended drawings, in which.

DETAILED DESCRIPTION OF SOME EXAMPLE EMBODIMENTS

In the following, several embodiments of the invention will be described in the context of media files and wireless communication. It is to be noted, however, that the invention is not limited to media files and wireless communication. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 3:
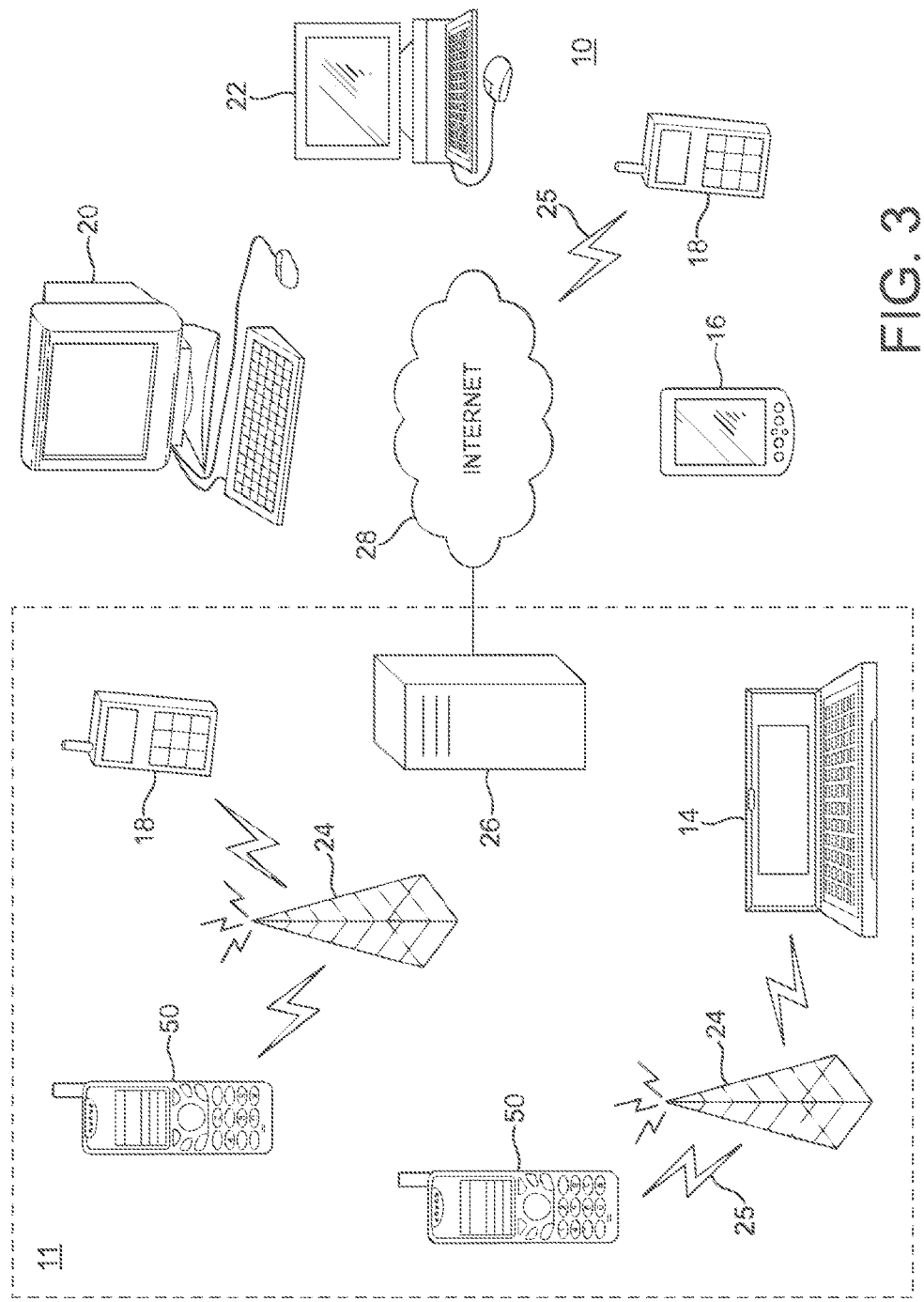
FIG. 3 shows an example of an arrangement for wireless communication comprising a plurality of apparatuses, networks and network elements.
Figure 4:
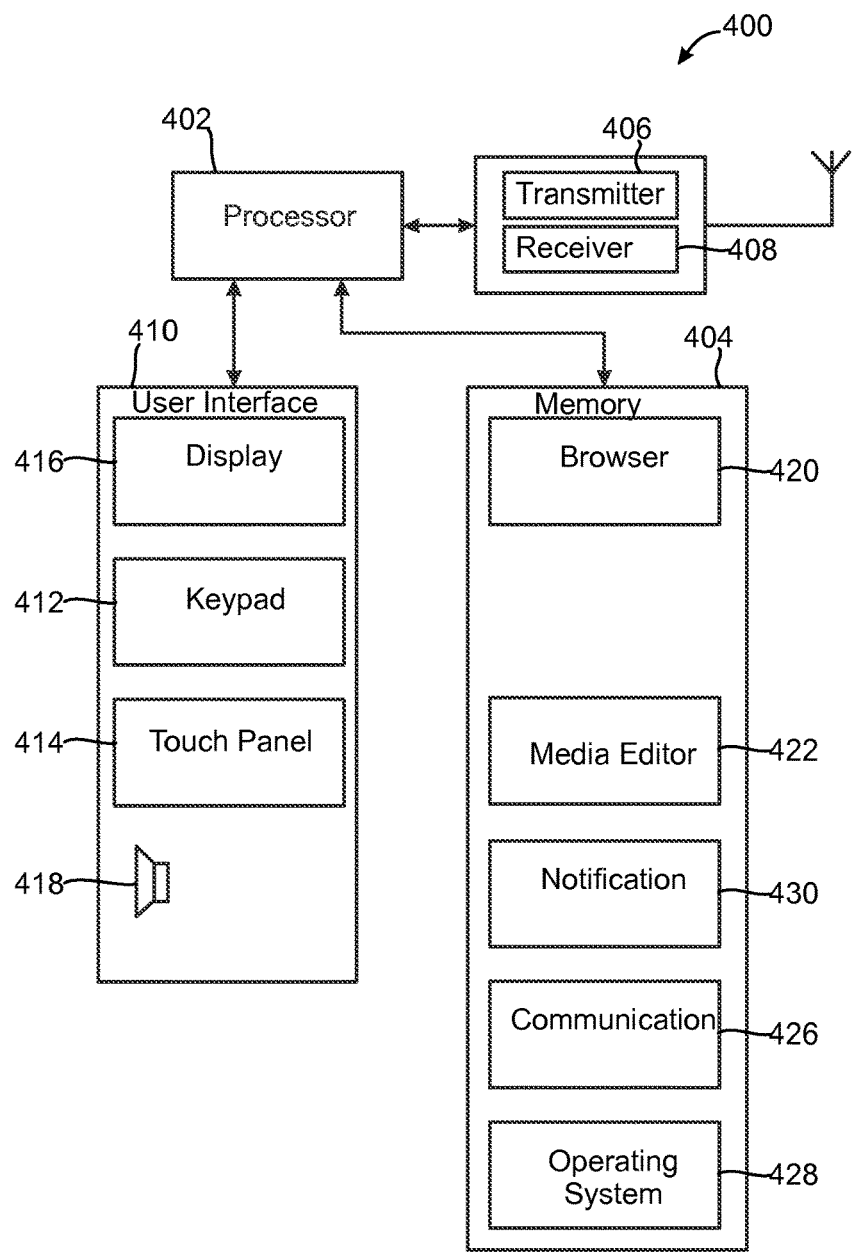
FIG. 4 shows a block diagram of an apparatus usable as a user device according to an example embodiment.

FIG. 4 depicts an example of some details of an apparatus 400 which can be used in a user device 600. The apparatus 400 comprises a processor 402 for controlling at least some of the operations of the apparatus 400, and a memory 404 for storing user data, computer program instructions, possible parameters, registers and/or other data. The apparatus 400 may further comprise a transmitter 406 and a receiver 408 for communicating with other devices and/or a wireless communication network e.g. via a base station 24 of the wireless communication network an example of which is depicted in FIG. 3. The apparatus 400 may also be equipped with a user interface 410 (UI) to enable the user of the apparatus 400 to enter commands, input data and dial a phone number, for example. For this purpose the user interface 410 may comprise a keypad 412, a touch sensitive element 414 and/or some other kinds of actuators. The user interface may also be used to provide the user some information in visual and/or in audible form e.g. by a display 416 and/or a loudspeaker 418. If the user interface 410 comprises the touch sensitive element 414, it may be positioned so that it is at least partly in front of the display 416 so that the display 416 can be used to present e.g. some information through the touch sensitive element 414 and the user can touch the touch sensitive element 414 at the location where the information is presented on the display 416. The touch and the location of the touch may be detected by the touch sensitive element 414 and information on the touch and the location of the touch may be provided by the touch sensitive element 414 to the processor 402, for example. For this purpose, the touch sensitive element 414 may be equipped with a controller (not shown) which detects the signals generated by the touch sensitive element and deduces when a touch occurs and the location of the touch. In some other embodiments the touch sensitive element 414 provides some data regarding the location of the touch to the processor 402 wherein the processor 402 may use this data to determine the location of the touch. The combination of the touch sensitive element 414 and the display 416 may also be called as a touch screen.

In some embodiments the keypad 412 may be implemented without dedicated keys or keypads or the like e.g. by utilizing the touch sensitive element 414 and the display 416. For example, in a situation in which the user of the device is requested to enter some information, such as a telephone number, her/his personal identification number (PIN), a password etc., the corresponding keys (e.g. alphanumerical keys or telephone number dialling keys) may be shown by the display 416 and the touch sensitive element 414 may be operated to recognize which keys the user presses. Furthermore, although the keypad 412 would be implemented in this way, in some embodiments there may still exist one or more keys for specific purposes such as a power switch etc.

In some embodiments the touch sensitive element 414 may be able to detect more than one simultaneous touch and provide information on each of the touches (e.g. the location of each of the touches). The term simultaneous touch does not necessarily mean that each simultaneous touch begins and ends at the same time but that the simultaneous touches are at least partly overlapping in time.

When the processor 402 has received or determined information on the location of the touch the processor 402 may determine whether the touch should initiate an operation in the apparatus 400. For example, the detection of the touch may indicate that the user wants to play back a media file on the display 416 of the apparatus 400.

The user interface can be implemented in many different ways wherein the details of the operation of the user interface 410 may vary. For example, the user interface 410 may be implemented without the touch sensitive element wherein the keypad may be used to inform the apparatus 400 to start a browser, to start playing back a media clip, to inform the user of available content for the media clip, selection of a content to be delivered from a server, etc.

Figure 5:
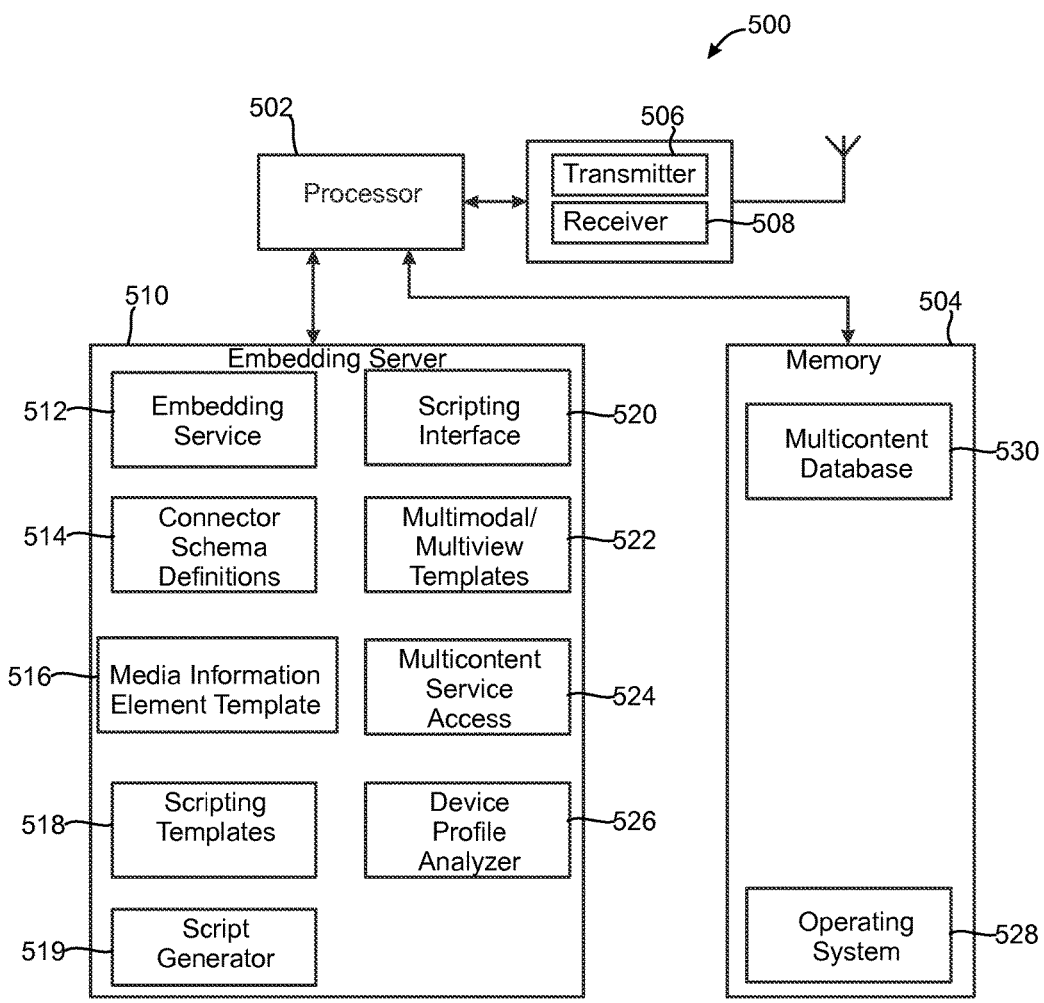
FIG. 5 shows a block diagram of an apparatus usable as a server according to an example embodiment.

FIG. 5 depicts an example of some details of an apparatus 500 which can be used in a server 510. The apparatus 500 comprises a processor 502 for controlling at least some of the operations of the apparatus 500, and a memory 504 for storing user data, computer program instructions, possible parameters, registers and/or other data. The apparatus 500 may further comprise a transmitter 506 and a receiver 508 for communicating with other devices and/or a wireless communication network e.g. via a base station 24 of the wireless communication network.

The apparatus 500 may also comprise an embedding server 510. The embedding server 510 may include some functionalities for implementing the multicontent provision. The functionalities may include, for example, an embedding service 512, connector schema definitions 514, one or more templates for media information element 516, scripting templates 518, a script generator 519, scripting interface 520, multimodal/multiview templates 522, multicontent service access 524 and device profile analyser 526. The memory 504 of the apparatus 500 may also comprise a multicontent database 530 but it may also be external to the apparatus. Furthermore, the multicontent database 530 need not be stored in one location but may be constructed in such a way that different parts of the multicontent database 530 are stored in different locations in a network, e.g. in different servers.

The apparatuses 400, 500 may comprise groups of computer instructions (a.k.a. computer programs or software) for different kinds of operations to be executed by the processor 402, 502. Such groups of instructions may include instructions by which a browser application communicates with the communication network and displays information on the display of the user device 600, forms a request for obtaining a media clip and multicontent, etc. In the server the software may include groups of instructions for obtaining multicontent and forming a meta information element for a media clip, receive requests from user devices and send responses to them, etc.

The apparatuses 400, 500 may also comprise an operating system (OS) 428, 528, which is also a package of groups of computer instructions and may be used as a basic element in controlling the operation of the apparatus. Hence, the starting and stopping of applications, services and other computer programs, changing status of them, assigning processor time for them etc. may be controlled by the operating system. Description of further details of actual implementations and operating principles of computer software and operating systems is not necessary in this context.

The user device may be operable as a mobile phone, a computer such as a laptop computer, a desktop computer, a tablet computer etc. and may also be provided with local (short range) wireless communication means, such as Bluetooth ™ communication means, near field communication means (Nfc), communication means for communicating with a wired communication network and/or communication means for communicating with a wireless local area network (WLAN).

In this context the short range wireless communication may mean communication within a distance (range) of a few centimetres, a few meters, ten meters, some tenths of meters, hundreds of meters or even some kilometres. It should also be noticed that the actual range need not be accurate or symmetrical to each direction but may vary depending e.g. on possible obstacles between a source device and a user device, radiating properties of the antenna of the source device and the user device etc.

Figure 6:
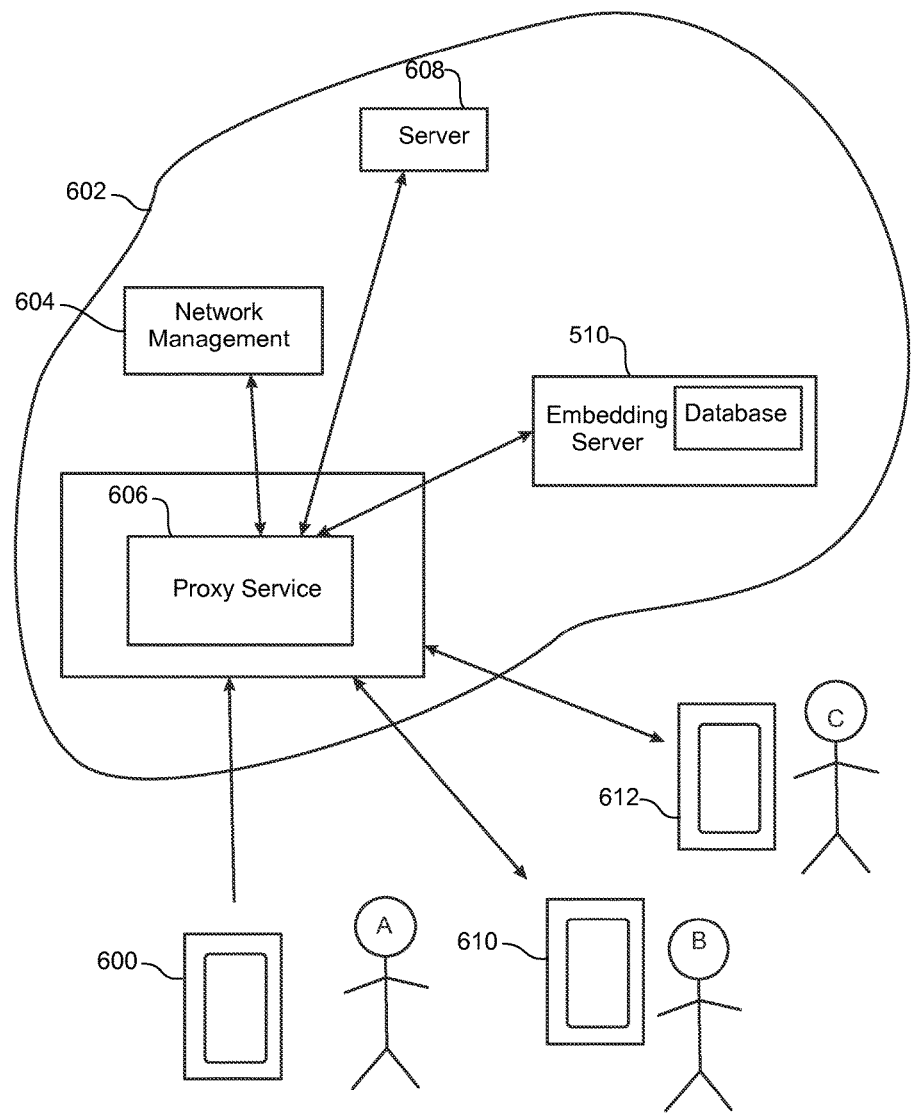
FIG. 6 shows an example situation in which some embodiments may be used.

In the following, some non-limiting example situations in which the invention may be used are described in more detail. In a first example, as depicted in FIG. 6, some friends A, B, C are within a certain area, e.g. in the same room. They all may have a device 600, 610, 612 which is capable of capturing images, video and/or audio. The event the friends are attending may, for example, be a birthday party. User A may capture by her/his device a video of cutting a cake and the user B may capture by her/his device a video from another viewpoint and possibly of another situation occurring during the birthday party. The user C may also use her/his device to capture some media clips of the event, such as record an audio clip during the event and/or capture images from her/his viewpoint. The captured/recorded images, video and audio may also be called as media clips in this context but the term media clip is not to be interpreted narrowly to mean only such short clips captured during an event. The users A, B and/or C may send (upload) the captured media clips to a server 510 e.g. via a wireless communication network. The media clips may then be stored by the server 510 together with some meta information relating to the media clips. The meta information may include e.g. time of the capturing of the media clip, information on the location where the media clip was captured, information on the identity of the device and/or the user of the device which captured the media clip, information on the type of the media clip, information describing the event where the media clip was captured (information relating to the context of the event), information inserted by the user to describe the contents of the media clip, etc. It should be noted here that the event may be any kind of a situation in which media may be captured. The event may be an organized event such as a concert, a theatre, a party, or it may relate to an occasional event such as walking on a street, visiting a city, a holiday trip, etc.

The media clips may be segmented by dividing the media clips into one or more segments each containing one or more parts of the media clips, such as frames and/or images. The segmentation may be based on the content of the image. For example, if the user captures multiple video clips during an event and sends them either separately or together to the server, the user device or the server may combine the video clips into a media file in which each video clip may form one segment. However, there may also be other criteria for the segmentation such as location, time, background sounds, the amount of ambient light, etc. In some embodiments the background sounds recorded by the user device during the capture of a video may include music played at the event wherein when the music track changes the server may conclude that a new segment could be started, wherein the next part of the video could be included in a new segment. In some embodiments the segmentation may also be based on scene cuts in a video presentation, wherein when there is a significant change between two successive frames of the video presentation it may be concluded that the current segment should end and a new segment should begin.

The media clips may also be constructed by the user, wherein the user may conclude the segmentation during the media clip construction process, or the segmentation may still be performed by analysing the content of the media clip. For example, the user may collect different video clips, images and/or audio clips and combine them as a new media clip. The construction may be performed e.g. by using a media editor 422, a browser 420 or another application which is appropriate for this purpose.

Media clips may be attached with meta information, which may be used to provide alternative presentations of the media clip, additional information and/or other content relating to the media clip when the media clip is played back. For example, the media clip may contain video clips captured using a certain resolution and audio clips recorded during an event. There may, however, exist higher or lower resolution versions of the same video clip and/or somebody else has also captured a video clip in the same event but from a different viewpoint. Hence, the meta information element may contain information which indicates such alternative contents available for the media clip. The user who is playing back the media clip may then select some of the alternative contents for playing back, or for displaying the additional information.

The concepts of alternative presentations of a media clip, additional information, and other content relating to the media clip are also called as multicontent in this specification.

The meta information (a.k.a. metadata) relating to a segment is a kind of a description of the content in the segment. The metadata may contain information than enables multiple presentation options and/or interaction with the content.

A software called as a "Director's Cut" may be used to combine a plurality of media content into one continuous media presentation. For example, a large number of clips taken by audience of an event from different viewpoints may be analysed by the software and combined together in a logical order or appearance. Not only video and audio clips but audience may also supply photographs, which can be added into the final video at random places, for example. The operation of the Director's Cut software may be controlled by some parameters to prefer or reduce clips based on e.g. device type, user name, or type of content (e.g. a snap shot photo, video, audio).

In the following, some other, non-limiting examples of the other content are provided. The media clip may contain a scene cut in which one or more persons can be seen, wherein the other content may be for example things related to the person in the scene cut. The media clip may have been recorded in a certain place of which some information is available e.g. in the internet, wherein the other content may comprise an address to the location of the information in the internet. In yet another example the multicontent may mean multiple alternate segments so that users or media players can play an alternate segment depending on context, different viewpoints of a particular view in a segment, multimodal interfaces for a particular segment, object and semantic content based service query for segments or group of segments, alternate editions of a group of content (for example alternate Director's Cut segment), contact controls for persons depicted within media segments, the name of a piece of music included in an audio clip, etc.

In some embodiments the audio sounds of an audio clip may be analysed to find out if the audio clip contains a music presentation. If the analysis indicates that the music presentation exists in the media clip, the meta information may indicate more details of the piece of music presented and/or an address from which the piece of music or another version of the piece of music may be downloaded for playback. This kind of procedure may be useful e.g. when a user has captured video and audio in a concert and the user wanted to play back a higher quality version of the music presentation (instead of the original audio clip) when s/he watches the video. Also the additional information related to the music presentation and/or the concert, if available, may be obtained and shown to the user.

In some embodiments the meta information element 802 of a media clip 800 is constructed so that it contains meta information for each segment of the media clip. Furthermore, the meta information may contain none, one or more connectors 804 for the available content. Furthermore, each segment may contain none, one or more action objects referring to one or more of the connectors of the media clip. In some embodiments the connectors are self-contained and they include information about the protocol and the parameters needed to connect to the content or external services. Connectors are connection definitions that tells how to connect to a service. Descriptors describe the content either semantically or structurally.

Figure 8:
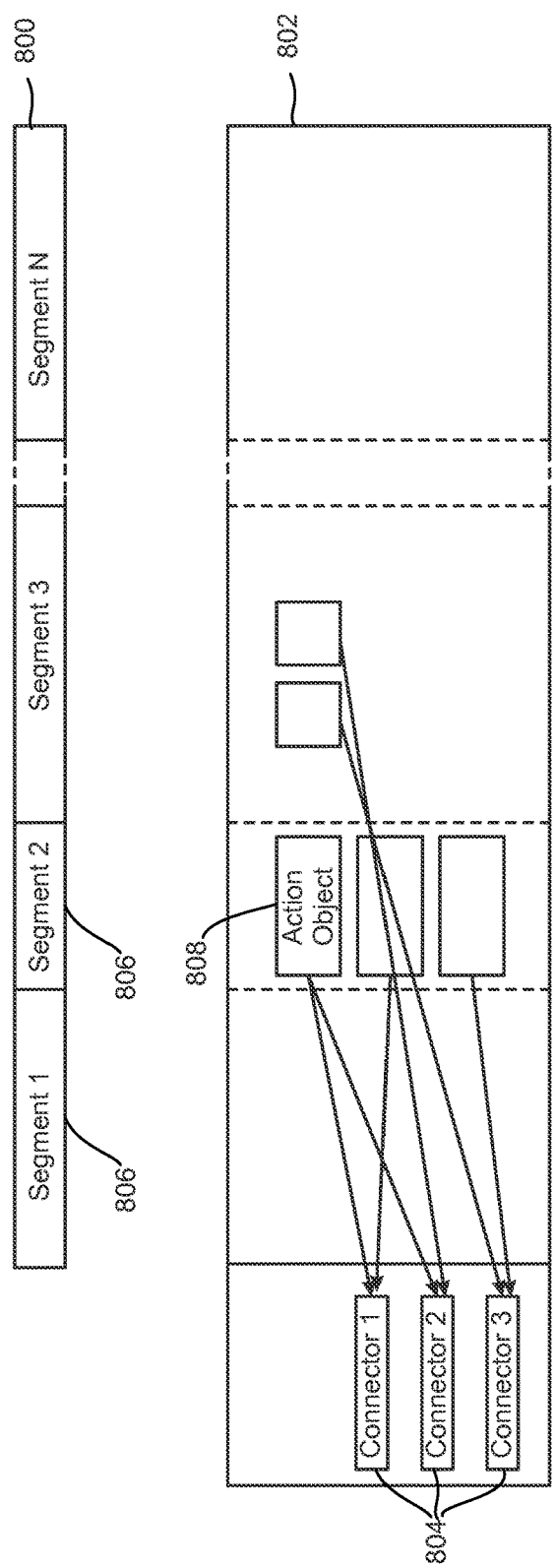
FIG. 8 shows an example of a media clip and a media information element related to the media clip.

In some embodiments there will be one access object for each multicontent characteristic for each segment 806. As seen in FIG. 8, each access object 808 can have one or more references to one or more connectors and are placed corresponding to the segments to whom they apply to. Each access object may be implemented as a script that gets executed by a script engine either as a part of a rendering engine or use a scripting engine of a browser. However, this is not the only way to implement the access objects.

Access objects may be organized into state blocks. The activation of an access object can be made e.g. by the user or through a contextual change for which access objects would have registered notifications for. Once an access object has been activated, it will take one of the states described within the state blocks. Each state block can connect to one or more connectors and being able to invoke the connectors along with providing parameters that allows to query a service through the connector.

In some embodiments each state block can register events to user interaction inputs that is provided by the renderer, to context inputs coming from the device, and/or to a document object model (DOM) events coming from a container document rendered within a browser element. The container document can be e.g. an HTML 5 page capable of hosting a multimedia rendering engine.

The script used in the access object can be, for example, JavaScript or other scripting language. In order to work with web models, JavaScript could be an appropriate choice.

The access object blocks would register for events (through a DOM event object interface as an example) and corresponding callbacks (event sinks) that would act on events obtained from the registries. Access to event objects may be made through calls to the renderer seeking root access for those objects. There could be several mechanisms for getting the access. Some examples are given below:

Renderer.UIEvents. Register(eventName, eventSink)
Renderer.Context.Access(contextName, updateFrequeny, eventSink)
Browser.Context.Access( )
Browser.getRootNode(DOMEvents, eventSink). In this alternative the eventSink may not be needed in the call.

State blocks can refer to connectors either by using the connector name (for example: XMLHttpRequest) or the connector id. The script has been created by the service, hence the service is aware of the id generated for the connectors and can use the id in the reference to the connectors.

The server may attach the meta information element with the media clip so that when the media clip is accessed by a user device for downloading, the meta information is also accessible and may be downloaded to the user device.

The structure of the meta information element may vary in practical implementations. In some embodiments the meta information element may be constructed using a mark-up language. such as a hypertext mark-up language (HTML), a hypertext mark-up language version 5 (HTML5), an extensible mark-up language (XML), a document definition mark-up language (DDML), any standard meta-information or meta-content definition language, or their derivatives or extensions.

In some embodiments the size of the meta information element may be kept relatively small by only including an address or another kind of a descriptor of the content which is available for the media clip in the meta information element. Hence, the content may be obtained from the storage of the content by using the descriptor. However, in some embodiments it may also be possible to embed the content or some parts of the content into the meta information element. This may be an appropriate method e.g. when the size of the content is relatively small and the size required by the descriptor would be almost the same or even more than the size required to store the content. On the other hand, if the content may change from time to time it may still be beneficial to store the descriptor and not the content itself in the meta information element, wherein the meta information element need not be changed every time the content changes, if the location of the content remains the same.

Figure 7:
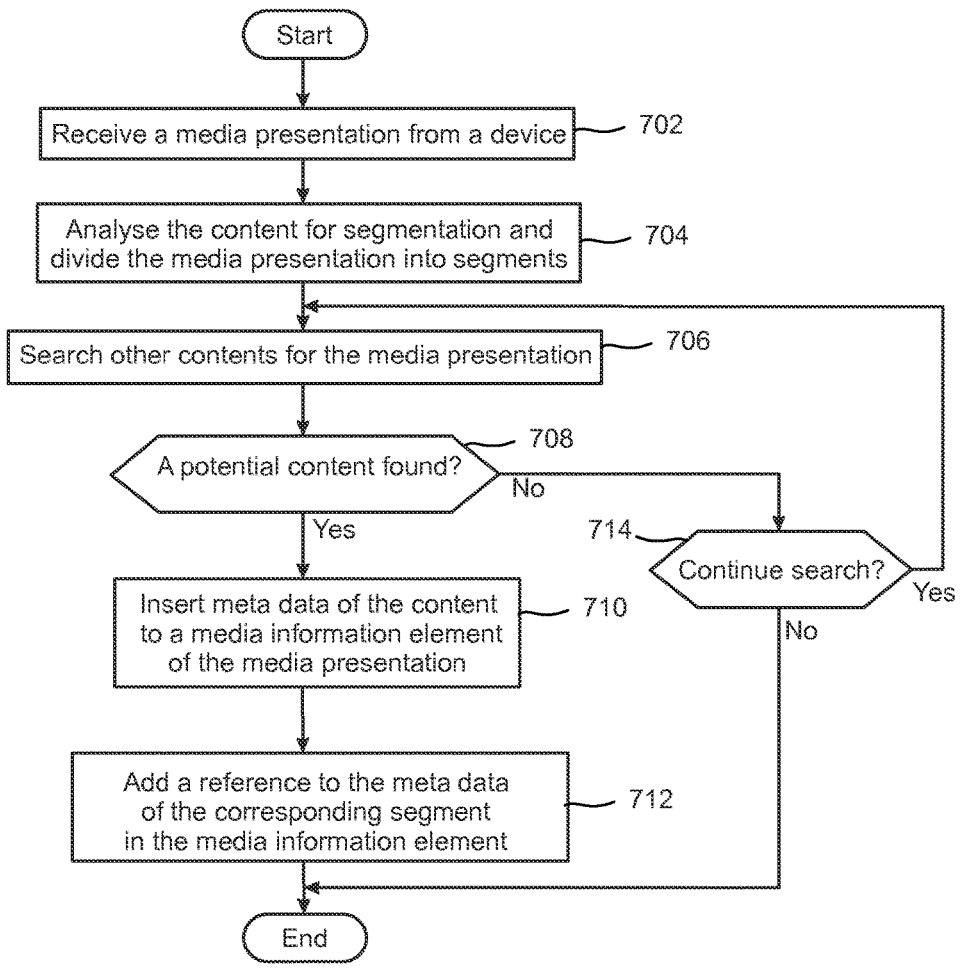
FIG. 7 shows as a flow diagram a method according to an example embodiment.

In the following an example embodiment of constructing the media information element for a media clip in a server 510 is disclosed in further detail with reference to FIGS. 5, 6 and 7. The server 510 may receive (illustrated with block 702 in FIG. 7) the media clip from a user device 600 and store it into a memory of the server 510 or the server 510 may already have stored the media clip and/or the server may obtain the media clip from another source. The received media clip may already comprise one or more segments or the server 510 may perform the segmentation, if the received media clip is not segmented yet. The media clip may contain one or more different types of media content, such as still image(s), video clip(s), audio clip(s), etc.

If the media clip is not segmented, the server 510 may perform the segmentation by e.g. analysing 704 the contents of the media clip and deduce which parts of the media could be segmented within the same segment and which could be segmented within other segments. In this context the segmented media clip need not contain more than one segment but may do so. The upper limit of the number of segments may also be undefined and the number of segments may vary in different media clips. The segmentation of the media clip may also be changed if the content of the media clip changes.

When the media clip has been segmented, the server 510 may search 706 other contents or content sources related to the media in the segments to obtain the multicontent kind of media clip. The server 510 may comprise e.g. an embedding service 512 for that purpose. The embedding service 512 may search other content from the memory 504 of the server 510, from other user devices 610, 612, from other parts of the network 602 (e.g. from one or more servers 608 in the network 602), etc.

The determination whether another content is classified as being appropriate content for the media in a segment may be based on different criteria. When the embedding service 512 have found 708 a potential content to be added for the media of the segment, the embedding service 512 may, for example, examine the capturing location which may have been defined for the potential content, capturing time stamp of the potential content, the type of the potential content, etc. In some embodiments the embedding service 512 may analyse the potential content to determine if it has some similarities with the content of the segment of the media, e.g. contains similar music, similar objects in a scene cut, same person(s) in a scene cut, etc. In some embodiments, the embedding server may use the description or annotation provided by the user (or sourced externally from external content servers that provide annotations) to find relations between different media and media types.

If the embedding service 512 deduces that the potential content can be classified as being appropriate content for this media segment, the embedding service 512 may insert 710 the potential content to a list of available contents of this media segment. The content itself need not be inserted in the media clip or in the media information element, but a descriptor of the content. The descriptor may contain some identifying information of the content such as the type and the address of the content. The descriptor may be added to the media descriptor field (MD) of the media information element an example of which is depicted in FIG. 8. The segment for which the content was classified as an available content is added 712 with a reference to the descriptor. This may be implemented as inserting a corresponding definition into an action object of the segment.

If it is determined in step 708 that no potential contents has been found, the search may be continued 714 e.g. from another source, or after a certain period of time, or the search may be stopped. Although the search were stopped at this stage, it may still be continued at a later stage.

In some embodiments each resource (content) is given an identifier (resource id) within the meta information element and the media descriptor field provides the parameters and the identifier of the resources to provide the parameters to.

Depending on the segment requirements, the connectors may be declared. Therefore, not all connectors need to be declared. In one embodiment, the declaration is done after a request for the content has been received by the server.

In the following an example of an object representation is described.

```
<connectionContainer>
  <connector id=xxxx>
    <connectorType namespace="www.ns.com">
      XMLHttpRequestObject
    </connectorType>
    <maxConnections>20</maxConnections>
    <serviceURI id=1234>www.nokia.com/DirectorsCut </serviceURI>
    <serviceURI id=1256>www.nokia.com/MultiViewCut </serviceURI>
    <credentials>
      <serviceCredentials></serviceCredentials>
      <userCredentials></userCredentials>
    </credentials>
  </connector>
  <connector id="cccc">
    .......
    .......
  </connector>
</connectionContainer>
```

However, the above example is not the only possible object representation but the object may also be described using some other appropriate method.

The embedding service 512 may observe whether new content options for a media segment becomes available and if so, may add a corresponding definition to the media information element. Accordingly, if some content already declared available for a media segment changes or a new version of the content becomes available, the embedding service 510 may change the definitions of that content in the media information element, if necessary.

In the following some examples of communication between the user device 600 and the server 510 with respect to media clips will be provided in more detail.

When the user device 600 determines that the user wishes to get some additional content for the media clip, the user device 600 can signal to the server 510 information about the additional content requested by the user. The signals may be exchanged between the server 510 and the user device 600 for seeking dynamic content. The possible signals are declared within the meta information element corresponding to each type of actions that is described within the action object. The source and destination is also communicated as a part of the signal. The data channel may be any appropriate communication channel such as the internet, a LAN, etc., or any combination of them.

The user device 600 may have been registered to the server 510 for content updates from server 510. Therefore, the server 510 may inform the user device 600 when new or updated content is available. Signals from the user device 600 to the server 510 for registration may include one or more the following parameters, and possibly some other parameters not mentioned here:
 The type of the content;
 Maximum length of the content;
 Minimum length of the content;
 The name and/or the identifier of the content.

The server 510 receives the registration signalling and creates a notifying element or some other appropriate way to determine which user device(s) 600 have requested indications of content changes.

The user may also use the user device 600 to search available content from the server 510. The corresponding signalling may include the following parameters:
 The type of the content, for example MPEG/JPEG, multi-content, HTML, XML, audio/basic, video/avs-video, application/x-binary, application/x-bzip, text/plain, image/bmp, text/html, image/jpeg etc);
 The name and/or the identifier of the content.
 The index of the content (from, to) (the index may depend on content type, for example: frame length, number of frames, start frame-end frame for video);
 The length of the content;
 The resolution of the content (for example VGA, SVGA, WSVGA, HD, etc.);
 Content encoding (for example mp4, AVCHD, FLV, WMV, MOV, etc.).

It may also be possible that the user may send some content to the server 510. In this case, the corresponding signalling may be applied between the user device 600 and the server 510. The signalling may include the following parameters:
 The type of the content;
 The content itself;
 The identifier of the script or the form that sent the content;
 The address (e.g. a uniform resource locator, URL) for script processing.

The context of the user device 600 may change sometimes. For example, the user installs new software to the user device 600 or deletes some existing software of the user device 600, the user may have connected new apparatuses, extension cards, and/or some other technical equipment which affect the capabilities of the user device 600. Hence, the user device 600 may become capable of handling more alternatives of the available content of a media segment. This capability change may then be informed to the server e.g. by signalling the following parameters to the server 510:
 Context representation (any format, example XML);
 New context types.

The context change may also occur when the user device 600 changes location. For example, the user device 600 may be able to use a high speed local area network when the user (and the user device 600) is at home or at work, but may only be able to use lower speed communication network when travelling. Hence, the content the user may wish to play back may vary in different operating environments.

The above examples illustrated the signalling from the user device 600 to the server 510. In the following, some examples of signalling from the server 510 to the user device 600 will be briefly described. The list of parameters mentioned below is not exclusive and the server may also send some other parameters as well.

The server 510 may have obtained an updated version of some available content. The server 510 may then examine which user devices 600 have indicated the server 510 that they want to receive indication of content changes, such as content updates. In other words, the server 510 may examine which user devices 600 have been registered for content updates. The server 510 may then send to those user device(s) 600, which have been registered for content updates, one or more of the following parameters and may also send some other parameters not mentioned in this context:

The type of the content;
The type of the script and script information;
The type of the access object;
The index for the meta information element where this update is applicable;
The name and/or the identifier of the content.
The length of the content;
The resolution of the content.

The server 510 may also wish to replace an existing content with a new version of the content or with another content. If so, the server 510 may send to the user device(s) 600 one or more of the following parameters:

The type of the new content;
The type of the content to be replaced;
The identifier of the content to be replaced;
The type of the script and script information;
The type of the access object;
The index for the meta information element where this update is applicable;
The name and/or the identifier of the content.
The length of the content;
The resolution of the content.

The type of the script and script information may be optional, if the old identifier of the content is replaced with new one and if the script is not to be replaced.

Actually, the replacement of an existing content with a new content type may mean that only the existing content type entry within an action object is replaced with a new one and the old content remains untouched. This is possible when the media information element does not contain the content but an address of the content located outside the media information element.

When the user device 600 has indicated the server 510 that the context of the user device 600 has changed, the server 510 may inform the user device 600 that the server 510 shall send the user device 600 notifications for new context changes. The parameters of this signalling may include one or more of the following:

New context type indicated by the user device;
Context update interval;
Format types, if any.

All requests and other signals sent by the user device 600 may be acknowledged by the server 510, and, respectively, all requests and other signals sent by the server 510 may be acknowledged by the user device 600. However, it is to be noted that the service may operate in synchronous or in asynchronous mode.

When the user device 600 sends the request for content or request for receiving notifications of changed/updated content, the user device 600 constructs e.g. a message for the transmission of the request. The request may contain information of the profile of the user device 600: The profile may contain information of the hardware properties of the device, such as the resolution of the display, the processing capabilities of the device, etc. The profile may also contain information on the software properties of the device, e.g. which kind of media player or another renderer application and/or a browser application is installed in the device. The software properties may also include information of the operating system of the user device 600 and possibly information of the version of the operating system. The profile may be used by the server 510 to know what connectors are supported by the renderer or browser or the renderer within the browser or a combination of both. The server 510 may then select which connectors are needed, create object representations for each object, and embed them within the media information element. The object representations may be provided in accordance with a standard definition, if such has been defined, or with another definition known both by the server 510 and the user device 600.

In some embodiments the profile may correspond with or may contain the user agent profile specification (UAProf) or a dynamic profile but also other ways to provide the properties of the user device 600 may be applicable in practical implementations.

In the following an example of a situation in which the available content may be utilized is briefly described. It is assumed that the user of the user device 600 is using a browser application of the user device 600 for browsing internet. The user finds a media clip which s/he wishes to play by the user device 600. The browser application initiates a request for downloading the media clip. The request is transmitted to the server 510 which handles the request and determines that the media clip should be transmitted to the user device 600. The server 510 then searches the media clip which is attached with the media information element, and transmits the media clip and the media information element to the user device 600. The user device 600 may store the media clip and the media information element into the memory of the user device 600. The browser application may then start to play the media clip. When the media clip is being played, the scripts in the media information element are also executed. For example, if the media information element contains one or more action objects for a segment in the media clip, the action object is executed when the playback of that segment of the media clip begins. If the descriptors related to that segment indicate that some alternative or additional content i.e. multicontent is available, the browser application may inform this to the user. The user may select some of the available contents for playback or continue with playing back the original content of that segment.

In another example the selection of the possibly available multicontent is performed asynchronous with respect to the playback of the media clip e.g. in such a way that when the user has selected the media clip for playback, scripts in the media information element are executed and for each segment in which multicontent exists, the user is requested to select that content or those contents s/he wishes to play back. When the contents have been selected the play back of the media clip may be started with the selected contents.

If the user selects the option for receiving the content, the user device may run a content reception element which affects the user device to communicate with the source device for the content delivery. The communication may include transmitting a request message from the user device to the source device identifying the content to be delivered. The source device may then transmit the content to the user device. In some embodiments the communication may include establishing a communication connection between the source device and the user device, unless the communication connection has not previously been established between the source device and the user device.

The received content may e.g. be stored to a memory of the user device or to a storage media to which the user device is able to write data.

In some embodiments some or all of the available content may be restricted to authorized users only. Hence, one criteria for classifying an alternative or additional content may include authentication information of the user device (or the user of the user device). In this kind of situation information of the available content may not be indicated to the user if s/he is not among the authorized users.

The user authentication may be performed e.g. by using a fingerprint authentication, a user id and password based authentication, by using information related to a subscriber identification module (SIM) or by any other applicable authentication method.

In some embodiments the communication network 602 may comprise e.g. a proxy service 602 and/or a network management service 604 for controlling communication between devices attached with the communication network. For example, the user device 600 may send to a proxy service 602 of the communication network 602 information on the requested content. The proxy service 602 may communicate with a network management service 604 to find out the server 510 and routing information to be used when notifying the server 510 of the requested content and when downloading the content to the user devices 600, 610, 612.

Figure 1:
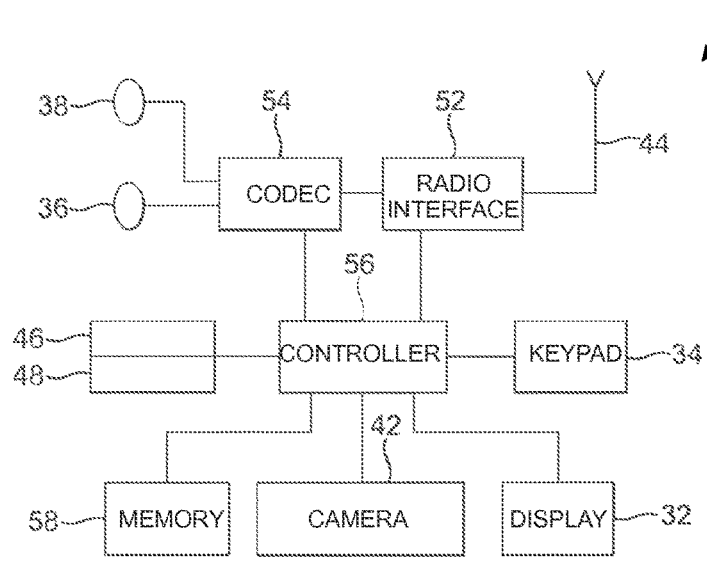
FIG. 1 shows a block diagram of an apparatus according to an example embodiment.
Figure 2:
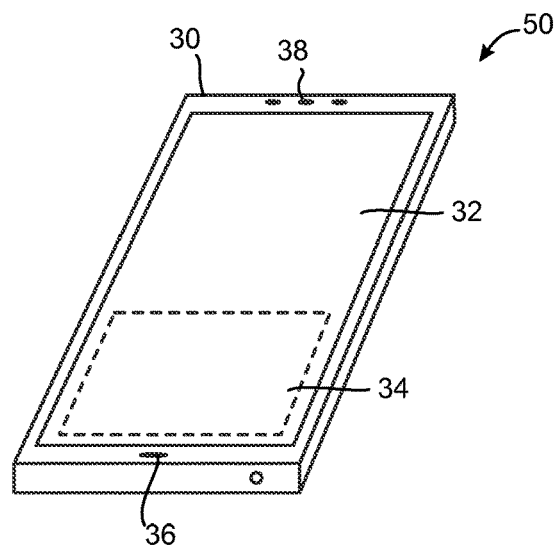
FIG. 2 shows an apparatus according to an example embodiment.

The following describes in further detail suitable apparatus and possible mechanisms for implementing the embodiments of the invention. In this regard reference is first made to FIG. 1 which shows a schematic block diagram of an exemplary apparatus or electronic device 50 depicted in FIG. 2, which may incorporate content delivery functionality according to some embodiments of the invention.

The electronic device 50 may for example be a mobile terminal or user equipment of a wireless communication system. However, it would be appreciated that embodiments of the invention may be implemented within any electronic device or apparatus which may utilize content delivery operations, either by setting content available for delivery and transmitting the content and/or by receiving the content.

The apparatus 50 may comprise a housing 30 for incorporating and protecting the device. The apparatus 50 may further comprise a display 32 e.g. in the form of a liquid crystal display, a light emitting diode (LED) display, an organic light emitting diode (OLED) display. In other embodiments of the invention the display may be any suitable display technology suitable to display information. The apparatus 50 may further comprise a keypad 34, which may be implemented by using keys or by using a touch screen of the electronic device. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (not shown) (or in other embodiments of the invention the device may be powered by any suitable mobile energy device such as solar cell, fuel cell or clockwork generator). The apparatus may further comprise a camera capable of recording or capturing images and/or video. In some embodiments the apparatus 50 may further comprise any suitable short range communication solution such as for example a Bluetooth wireless connection or a USB/firewire wired connection or an infrared port for short range line of sight optical connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise one or more radio interface circuitries 52 connected to the controller and suitable for generating wireless communication signals for example for communication with a cellular communications network, a wireless communications system or a wireless local area network and/or with devices utilizing e.g. Bluetooth™ technology. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within an apparatus within an electronic device, it would be appreciated that the invention as described below may be implemented as part of any apparatus comprising a processor or similar element. Thus, for example, embodiments of the invention may be implemented in a wireless communication device. In some embodiments of the invention the apparatus need not comprise the communication means but may comprise an interface to input and output data to communication means external to the apparatus. As an example, the touch and share operations or part of them may be implemented in a software of a tablet computer, which may be connected to e.g. a Bluetooth adapter which contains means for enabling short range communication with other devices in the proximity supporting Bluetooth communication technology. As another example, the apparatus may be connected with a mobile phone to enable communication with other devices e.g. in the cloud model.

It shall be appreciated that the term user equipment is intended to cover any suitable type of wireless communication device, such as mobile telephones, portable data processing devices or portable web browsers.

Furthermore elements of a public land mobile network (PLMN) may also comprise transceivers as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following, some examples will be provided.

According to a first example, there is provided a method for an apparatus, comprising:
  defining a content for at least one segment of a media presentation;
  providing a meta information element for the media presentation;
  including meta data relating to the content of the at least one segment to the meta information element, the meta data comprising information on how to access the content of the segment; and
  including a reference to the meta data of the content in the segment.

In some embodiments of the method the information on how to access the content of the segment comprises information enabling at least one of the following:
  multiple presentation options for the content;
  interaction with the content.

In some embodiments of the method the interaction enables fetching content from a server dynamically during presenting the media presentation.

In some embodiments the method further comprises providing in the description of the content a connector indicative of how to obtain the content.

In some embodiments of the method the connector comprises an indication of a storage location of the content.

In some embodiments the method further comprises providing the reference to the description of the content as an access object.

In some embodiments the method further comprises implementing the access object as a script to be executed when the segment is played back.

In some embodiments the method further comprises:
  including at least one media clip into the media presentation;

defining another content for the at least one segment;
providing a description of the another content in the meta information element; and
including a reference to the description of the another content in the segment.

In some embodiments the method further comprises:
searching for a potential alternative content for the media clip; and
if found, providing the potential content as the another content.

In some embodiments of the method the media clip is a first video clip captured from a first viewpoint and the another content is a second video clip captured from another viewpoint.

In some embodiments of the method the media presentation comprises at least one of the following:
an audio clip;
a video clip;
a still image.

According to a second example, there is provided an apparatus comprising at least one processor and at least one memory including computer program code, the at least one memory and the computer program code configured to, with the at least one processor, cause the apparatus to perform at least the following:
define a content for at least one segment of a media presentation;
provide a meta information element for the media presentation;
include meta data relating to the content of the at least one segment to the meta information element, the meta data comprising information on how to access the content of the segment; and
include a reference to the meta data of the content in the segment.

In some embodiments of the apparatus the information on how to access the content of the segment comprises information enabling at least one of the following:
multiple presentation options for the content;
interaction with the content.

In some embodiments of the apparatus the interaction enables fetching content from a server dynamically during presenting the media presentation.

In some embodiments of the apparatus said at least one memory stored with code thereon, which when executed by said at least one processor, further causes the apparatus to provide in the description of the content a connector indicative of how to obtain the content.

In some embodiments of the apparatus the connector comprises an indication of a storage location of the content.

In some embodiments of the apparatus said at least one memory stored with code thereon, which when executed by said at least one processor, further causes the apparatus to provide the reference to the description of the content as an access object.

In some embodiments of the apparatus said at least one memory stored with code thereon, which when executed by said at least one processor, further causes the apparatus to implement the access object as a script to be executed when the segment is played back.

In some embodiments of the apparatus said at least one memory stored with code thereon, which when executed by said at least one processor, further causes the apparatus to:
include at least one media clip into the media presentation;
define another content for the at least one segment;
provide a description of the another content in the meta information element; and
include a reference to the description of the another content in the segment.

In some embodiments of the apparatus said at least one memory stored with code thereon, which when executed by said at least one processor, further causes the apparatus to:
search for a potential alternative content for the media clip; and
if found, to provide the potential content as the another content.

In some embodiments of the apparatus the media clip is a first video clip captured from a first viewpoint and the another content is a second video clip captured from another viewpoint.

In some embodiments of the apparatus the media clip comprises at least one of the following:
an audio clip;
a video clip;
a still image.

In some embodiments the apparatus comprises a communication device comprising:
a user interface circuitry and user interface software configured to facilitate a user to control at least one function of the communication device through use of a display and further configured to respond to user inputs; and
a display circuitry configured to display at least a portion of a user interface of the communication device, the display and display circuitry configured to facilitate the user to control at least one function of the communication device.

In some embodiments of the apparatus the communication device comprises a mobile phone.

According to a third example, there is provided a computer program product including one or more sequences of one or more instructions which, when executed by one or more processors, cause an apparatus to perform at least the following:
define a content for at least one segment of a media presentation;
provide a meta information element for the media presentation;
include meta data relating to the content of the at least one segment to the meta information element, the meta data comprising information on how to access the content of the segment; and
include a reference to a description of the meta data in the segment.

In some embodiments of the computer program the information on how to access the content of the segment comprises information enables at least one of the following:
multiple presentation options for the content;
interaction with the content.

In some embodiments of the computer program the interaction enables fetching content from a server dynamically during presenting the media presentation.

In some embodiments the computer program comprises one or more sequences of one or more instructions which, when executed by one or more processors, cause the apparatus to provide in the description of the content a connector indicative of how to obtain the content.

In some embodiments of the computer program the connector comprises an indication of a storage location of the content.

In some embodiments the computer program comprises one or more sequences of one or more instructions which, when executed by one or more processors, cause the apparatus to provide the reference to the description of the content as an access object.

In some embodiments the computer program comprises one or more sequences of one or more instructions which, when executed by one or more processors, cause the apparatus to implement the access object as a script to be executed when the segment is played back.

In some embodiments the computer program comprises one or more sequences of one or more instructions which, when executed by one or more processors, cause the apparatus to:
 include at least one media clip into the media presentation;
 define another content for the at least one segment;
 provide a description of the another content in the meta information element; and
 include a reference to the description of the another content in the segment.

In some embodiments the computer program comprises one or more sequences of one or more instructions which, when executed by one or more processors, cause the apparatus to:
 search for a potential alternative content for the media clip; and
 if found, to provide the potential content as the another content.

In some embodiments of the computer program the media clip is a first video clip captured from a first viewpoint and the another content is a second video clip captured from another viewpoint.

In some embodiments of the computer program the media presentation comprises at least one of the following:
 an audio clip;
 a video clip;
 a still image.

In some embodiments the computer program is comprised in a computer readable memory.

In some embodiments the computer readable memory comprises a non-transient computer readable storage medium.

According to a fourth example, there is provided an apparatus comprising:
 means for defining a content for at least one segment of a media presentation, the media presentation comprising at least one segment;
 means for providing a meta information element for the media presentation;
 means for including meta data relating to the content of the at least one segment to the meta information element, the meta data comprising information on how to access the content of the segment; and
 means for including a reference to the meta data in the segment.

In some embodiments of the apparatus the information on how to access the content of the segment comprises information enables at least one of the following:
 multiple presentation options for the content;
 interaction with the content.

In some embodiments of the apparatus the interaction enables fetching content from a server dynamically during presenting the media presentation.

In some embodiments the apparatus further comprises means for providing in the description of the content a connector indicative of how to obtain the content.

In some embodiments of the apparatus the connector comprises an indication of a storage location of the content.

In some embodiments the apparatus further comprises means for providing the reference to the description of the content as an access object.

In some embodiments the apparatus further comprises means for implementing the access object as a script to be executed when the segment is played back.

In some embodiments the apparatus further comprises:
 means for including at least one media clip into the media presentation;
 means for defining another content for the at least one segment;
 means for providing a description of the another content in the meta information element; and
 means for including a reference to the description of the another content in the segment.

In some embodiments the apparatus further comprises:
 means for searching for a potential alternative content for the media clip; and
 means for providing the potential content as the another content, if the potential alternative content for the media clip is found.

In some embodiments of the apparatus the media clip is a first video clip captured from a first viewpoint and the another content is a second video clip captured from another viewpoint.

In some embodiments of the apparatus the media presentation comprises at least one of the following:
 an audio clip;
 a video clip;
 a still image.

According to a fifth example, there is provided a method for an apparatus, comprising:
 obtaining a media presentation comprising at least one segment;
 obtaining a meta information element attached with the media presentation, the meta information element comprising information on how to access content of the at least one segment; and
 examining a reference included in the meta information element to a meta data provided for the at least one segment, the meta data comprising information on how to access the content of the segment.

In some embodiments of the method the information on how to access the content of the segment comprises information enabling at least one of the following:
 multiple presentation options for the content;
 interaction with the content.

In some embodiments the method further comprises using the description of the content to fetch content from a server dynamically during presenting the media presentation.

In some embodiments the method further comprises obtaining from the description of the content a connector indicative of how to obtain the content.

In some embodiments of the method the connector comprises an indication of a storage location of the content.

In some embodiments of the method the reference to the description of the content is provided as an access object.

In some embodiments the method further comprises implementing the access object as a script to be executed when the segment is played back.

In some embodiments the method further comprises:
 determining whether multiple presentation options for the content are available; and
 if so, selecting one of the available presentation options for the content for playback.

In some embodiments of the method the media presentation comprises a first video clip captured from a first viewpoint and a second video clip captured from another viewpoint.

In some embodiments of the method the media presentation comprises at least one of the following:
- an audio clip;
- a video clip;
- a still image.

According to a sixth example, there is provided an apparatus comprising at least one processor and at least one memory including computer program code, the at least one memory and the computer program code configured to, with the at least one processor, cause the apparatus to perform at least the following:
- obtain a media presentation comprising at least one segment;
- obtain a meta information element attached with the media presentation, the meta information element comprising information on how to access content of the at least one segment;
- examine a reference included in the meta information element to a meta data provided for the at least one segment, the meta data comprising information on how to access the content of the segment.

In some embodiments of the apparatus the information on how to access the content of the segment comprises information enables at least one of the following:
- multiple presentation options for the content;
- interaction with the content.

In some embodiments of the apparatus the interaction enables fetching content from a server dynamically during presenting the media presentation.

In some embodiments of the apparatus said at least one memory stored with code thereon, which when executed by said at least one processor, further causes the apparatus to obtain from the description of the content a connector indicative of how to obtain the content.

In some embodiments of the apparatus the connector comprises an indication of a storage location of the content.

In some embodiments of the apparatus the reference to the description of the content is provided as an access object, wherein said at least one memory stored with code thereon, which when executed by said at least one processor, further causes the apparatus to execute the access object to obtain the content when the segment is played back.

In some embodiments of the apparatus said at least one memory stored with code thereon, which when executed by said at least one processor, further causes the apparatus to:
- determine whether multiple presentation options for the content are available; and
- if so, to select one of the available presentation options for the content for playback.

In some embodiments of the apparatus the media presentation comprises a first video clip captured from a first viewpoint and a second video clip captured from another viewpoint.

In some embodiments of the apparatus the media presentation comprises at least one of the following:
- an audio clip;
- a video clip;
- a still image.

In some embodiments the apparatus comprises a communication device comprising:
- a user interface circuitry and user interface software configured to facilitate a user to control at least one function of the communication device through use of a display and further configured to respond to user inputs; and
- a display circuitry configured to display at least a portion of a user interface of the communication device, the display and display circuitry configured to facilitate the user to control at least one function of the communication device.

In some embodiments of the apparatus the communication device comprises a mobile phone.

According to a seventh example, there is provided a computer program product including one or more sequences of one or more instructions which, when executed by one or more processors, cause an apparatus to perform at least the following:
- obtain a media presentation comprising at least one segment;
- obtain a meta information element attached with the media presentation, the meta information element comprising information on how to access content of the at least one segment;
- examine a reference included in the meta information element to a meta data provided for the at least one segment, the meta data comprising information on how to access the content of the segment.

In some embodiments of the computer program the information on how to access the content of the segment comprises information enabling at least one of the following:
- multiple presentation options for the content;
- interaction with the content.

In some embodiments of the computer program the interaction enables fetching content from a server dynamically during presenting the media presentation.

In some embodiments the computer program comprises one or more sequences of one or more instructions which, when executed by one or more processors, cause the apparatus to obtain from the description of the content a connector indicative of how to obtain the content.

In some embodiments of the computer program the connector comprises an indication of a storage location of the content.

In some embodiments of the computer program the reference to the description of the content is provided as an access object, wherein the computer program comprises one or more sequences of one or more instructions which, when executed by one or more processors, cause the apparatus to execute the access object to obtain the content when the segment is played back.

In some embodiments the computer program comprises one or more sequences of one or more instructions which, when executed by one or more processors, cause the apparatus to:
- determine whether multiple presentation options for the content are available; and
- if so, to select one of the available presentation options for the content for playback.

In some embodiments of the computer program the media presentation comprises a first video clip captured from a first viewpoint and a second video clip captured from another viewpoint.

In some embodiments of the computer program the media presentation comprises at least one of the following:
- an audio clip;
- a video clip;
- a still image.

In some embodiments the computer program is comprised in a computer readable memory.

In some embodiments the computer readable memory comprises a non-transient computer readable storage medium.

According to an eighth example, there is provided an apparatus comprising:
    means for obtaining a media presentation comprising at least one segment;
    means for obtaining a meta information element attached with the media presentation,
    the meta information element comprising information on how to access content of the at least one segment;
    means for examining a reference included in the meta information element to a meta data provided for the at least one segment, the meta data comprising information on how to access the content of the segment.

In some embodiments of the apparatus the information on how to access the content of the segment comprises information enabling at least one of the following:
    multiple presentation options for the content;
    interaction with the content.

In some embodiments of the apparatus the interaction enables fetching content from a server dynamically during presenting the media presentation.

In some embodiments the apparatus further comprises means for obtaining from the description of the content a connector indicative of how to obtain the content.

In some embodiments of the apparatus the connector comprises an indication of a storage location of the content.

In some embodiments of the apparatus the reference to the description of the content is provided as an access object, wherein the apparatus further comprises means for executing the access object to obtain the content when the segment is played back.

In some embodiments the apparatus further comprises:
    means for determining whether multiple presentation options for the content are available; and
    means for selecting one of the available presentation options for the content for playback, if the another content for the media clip exists.

In some embodiments of the apparatus the media presentation comprises a first video clip captured from a first viewpoint and a second video clip captured from another viewpoint.

In some embodiments of the apparatus the media presentation comprises at least one of the following:
    an audio clip;
    a video clip;
    a still image.

The invention claimed is:

1. An apparatus comprising at least one processor and at least one memory including computer program code, the at least one memory and the computer program code configured to, with the at least one processor, cause the apparatus embedded in a mobile user device to perform at least the following:
    obtain a media presentation comprising at least one segment;
    obtain a meta information element attached with the media presentation;
    examine a reference included in the meta information element to a meta data provided for the at least one segment, the meta data comprising information on how to access the content of the segment, location and time stamp information of the content, and one or more contact controls for at least one identical person in a scene cut depicted in the content and at least one alternate content; and
    while playing back the at least one segment, obtain and play back on a user interface of the mobile user device at least another segment with the at least one alternate content in conjunction with the playing back of the at least one segment,
    wherein the content and the at least one alternate content are captured from different viewpoints by different mobile user devices in time and location proximity with the mobile device,
    and
    wherein the at least another segment is played back based, at least in part, on at least one of the one or more contact controls for the at least one identical person in the scene cut.

2. An apparatus according to claim 1, wherein the at least one segment and the at least another segment is combined by the mobile user device as a director's cut and then played back together, and
    wherein the information on how to access the content of the segment comprises information enabling at least one of the following:
    multiple presentation options for the content;
    interaction with the content, the interaction enabling fetching content from a server dynamically during presenting the media presentation.

3. An apparatus according to claim 1, further comprising:
    receive a plurality of segments at the mobile user device from one or more other mobile user devices; and
    search locally at the mobile user device among the plurality of segments for the at least another segment by matching a location and a time stamp of the at least one segment against the location and time stamp information of the content; and
    obtain from the description of the content a connector indicative of how to obtain the content, wherein the connector comprises an indication of a storage location of the content.

4. An apparatus according to claim 1, wherein the reference to the description of the content is provided as an access object, wherein said at least one memory stored with code thereon, which when executed by said at least one processor, further causes the apparatus to execute the access object to obtain the content when the segment is played back.

5. A non-transitory computer-readable storage medium carrying one or more sequences of one or more instructions which, when executed by one or more processors, cause an apparatus to at least perform the following steps:
    obtain a media presentation comprising at least one segment;
    obtain a meta information element attached with the media presentation;
    examine a reference included in the meta information element to a meta data provided for the at least one segment, the meta data comprising information on how to access the content of the segment, location and time stamp information of the content, and one or more contact controls for at least one identical person in a scene cut depicted in the content and at least one alternate content; and
    while playing back the at least one segment, obtaining and playing back on a user interface of the mobile user device at least another segment with the at least one alternate content in conjunction with the playing back of the at least one segment, wherein the content and the at least one alternate content are captured from different viewpoints by different mobile user devices in time and location proximity with the mobile device, and wherein the at least another segment is played back based, at least in part, on at least one of the one or more contact controls for the at least one identical person in the scene cut.

6. A non-transitory computer-readable storage medium according to claim 5, wherein the information on how to access the content of the segment comprises information enabling at least one of the following:
   multiple presentation options for the content;
   interaction with the content, wherein the interaction enabling fetching content from a server dynamically during presenting the media presentation.

7. A non-transitory computer-readable storage medium according to claim 5, comprising one or more sequences of one or more instructions which, when executed by one or more processors, cause the apparatus to obtain from the description of the content a connector indicative of how to obtain the content, wherein the connector comprises an indication of a storage location of the content.

8. A non-transitory computer-readable storage medium according to claim 5, wherein the reference to the description of the content is provided as an access object, wherein the computer program comprises one or more sequences of one or more instructions which, when executed by one or more processors, cause the apparatus to execute the access object to obtain the content when the segment is played back.

9. An apparatus according to claim 3, wherein the mobile user device receives the at least one alternate content from the one or more other mobile user devices via one or more short range communication channels.

10. An apparatus according to claim 1, wherein the content and the at least one alternate content further contain similar music, one or more similar objects in a scene cut, or a combination thereof.

11. An apparatus according to claim 1, wherein the meta data includes an address from which the at least one alternate content to be downloaded.

12. A method comprising:
   obtaining, by a mobile user device, a media presentation comprising at least one segment;
   obtaining, by the mobile user device, a meta information element attached with the media presentation;
   examining, by the mobile user device, a reference included in the meta information element to a meta data provided for the at least one segment, the meta data comprising information on how to access the content of the segment, location and time stamp information of the content, and one or more contact controls for at least one identical person in a scene cut depicted in the content and at least one alternate content; and
   while playing back the at least one segment, obtaining and playing back on a user interface of the mobile user device at least another segment with the at least one alternate content in conjunction with the playing back of the at least one segment,
   wherein the content and the at least one alternate content are captured from different viewpoints by different mobile user devices in time and location proximity with the mobile device, and
   wherein the at least another segment is played back based, at least in part, on at least one of the one or more contact controls for the at least one identical person in the scene cut.

13. A method of claim 12, further comprising:
   obtaining from the description of the content a connector indicative of how to obtain the content, wherein the connector comprises an indication of a storage location of the content.

14. A method of claim 12, wherein the reference to the description of the content is provided as an access object, wherein said at least one memory stored with code thereon, which when executed by said at least one processor, further causes the apparatus to execute the access object to obtain the content when the segment is played back.

15. A method of claim 14, wherein the mobile user device receives the at least one alternate content from the one or more other mobile user devices via one or more short range communication channels.

16. A method of claim 12, wherein the content and the at least one alternate content further contain similar music, one or more similar objects in a scene cut, or a combination thereof.

17. A method of claim 12, wherein the content and the at least one alternate content are played back on the different mobile user devices depending on context, different viewpoints of a particular perspective, alternate editions of a director's cut, or a combination thereof.

18. A method of claim 12, wherein the content and the at least one alternate content are played back on the different mobile user devices depending on multimodal interfaces for a particular segment.

19. A method of claim 12, wherein the content and the at least one alternate content are played back on the different mobile user devices depending on an object and semantic content based service query for segments.

20. A method of claim 12, wherein the content and the at least one alternate content are played back on the different mobile user devices depending on a name of a piece of music included in an audio clip.

* * * * *